(12) United States Patent
Katsumata

(10) Patent No.: US 11,206,370 B2
(45) Date of Patent: Dec. 21, 2021

(54) RECORDING CONTROL APPARATUS, CONTROL METHOD THEREOF, AND STORAGE MEDIUM

(71) Applicant: CANON KABUSHIKI KAISHA, Tokyo (JP)

(72) Inventor: Kohei Katsumata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/737,761

(22) Filed: Jan. 8, 2020

(65) Prior Publication Data

US 2020/0228748 A1 Jul. 16, 2020

(30) Foreign Application Priority Data

Jan. 15, 2019 (JP) .............................. JP2019-004270

(51) Int. Cl.
*H04N 5/77* (2006.01)

(52) U.S. Cl.
CPC .................................. *H04N 5/772* (2013.01)

(58) Field of Classification Search
CPC ........ H04N 5/77; H04N 1/2112; H04N 5/772; H04N 2101/00; H04N 9/8042; G11B 27/105
USPC ........................................................ 386/225
See application file for complete search history.

(56) References Cited

U.S. PATENT DOCUMENTS

| 2012/0163763 A1* | 6/2012 | Fujimoto | H04N 5/772 386/225 |
| 2012/0311244 A1* | 12/2012 | Huang | G11C 16/0483 711/103 |
| 2015/0036995 A1* | 2/2015 | Sekiguchi | H04N 5/907 386/224 |

* cited by examiner

*Primary Examiner* — Thai Q Tran
*Assistant Examiner* — Nienru Yang
(74) *Attorney, Agent, or Firm* — Canon U.S.A., Inc. IP Division

(57) ABSTRACT

A recording control apparatus configured to control data recording to a recording medium in a first unit (AU) or in a second unit (RU) smaller than the first unit includes a position recording unit configured to control the recording medium to record a position of the second unit, the position being an intermediate position in the first unit, as position information when the data recording is completed, the position information being information about a position from which next data recording to the recording medium is to be started, and a control unit configured to control whether to cause the position recording unit to record the position information to the recording medium when the data recording is completed.

19 Claims, 4 Drawing Sheets

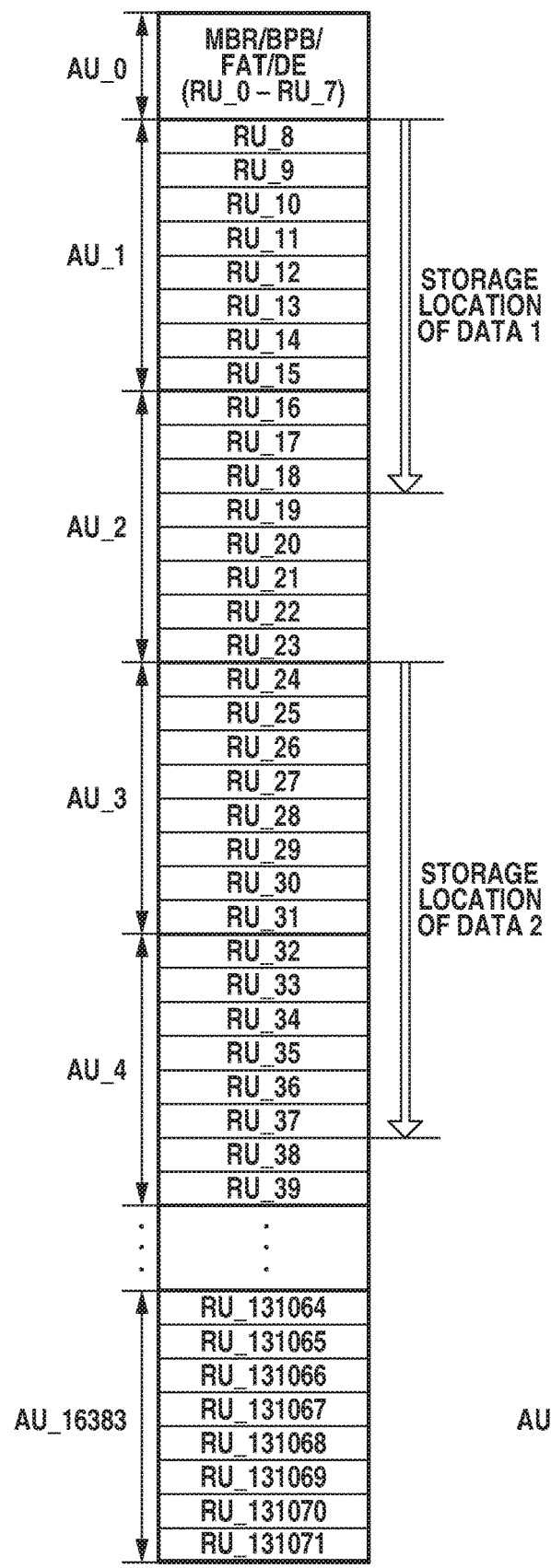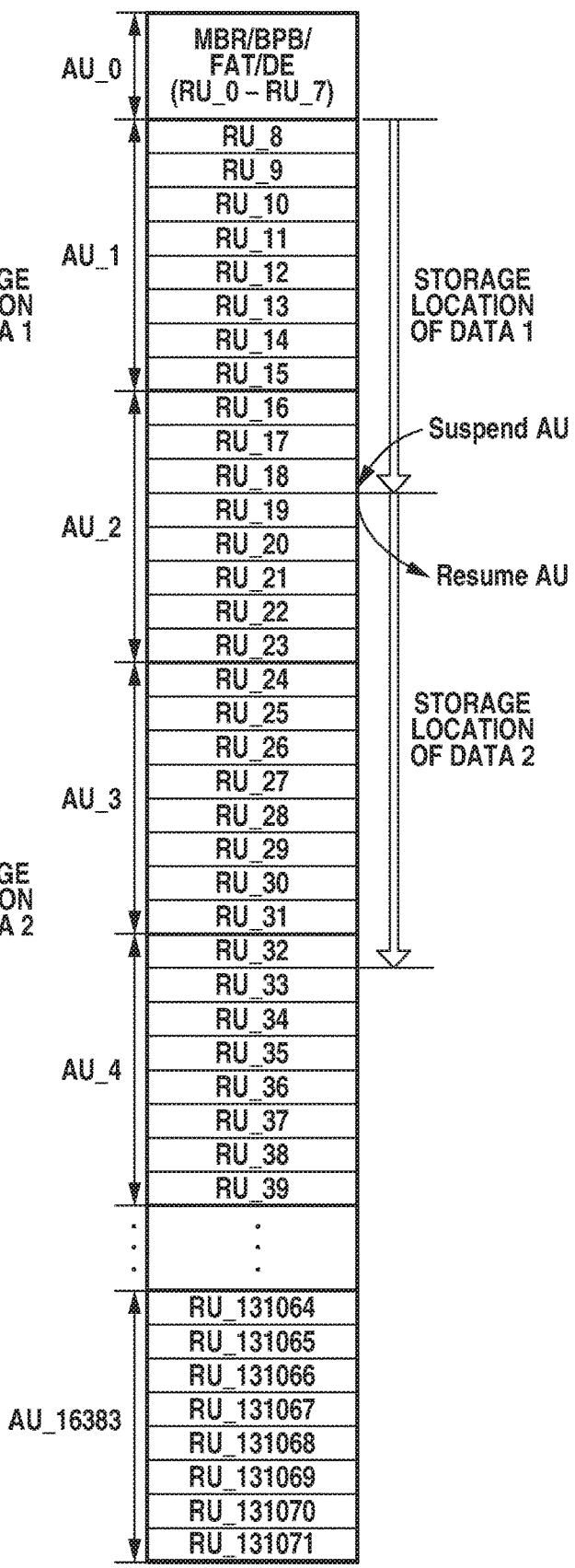

FIG. 3A

MOVING IMAGE 1 | Suspend AU Resume AU | MOVING IMAGE 2 | Suspend AU Resume AU | MOVING IMAGE 3 | Suspend AU Resume AU | MOVING IMAGE 4

Suspend AU Resume AU

MOVING IMAGE 1 | MOVING IMAGE 2-1 | MOVING IMAGE 2-2

MOVING IMAGE 1 | Suspend AU Resume AU | MOVING IMAGE 2-1 | MOVING IMAGE 2-2

MOVING IMAGE 1 | MOVING IMAGE 2

RU_0 | RU_1 | RU_2 | RU_3 | RU_4 | RU_5 | RU_6 | RU_7 | RU_8 | RU_9 | RU_10 | RU_11 | RU_12 | RU_13 | RU_14 | RU_15 | RU_16 | RU_17 | RU_18 | RU_19 | RU_20 | RU_21 | RU_22 | RU_23

AU1(16MB) | AU2(16MB) | AU3(16MB)

RECORDING CONTROL APPARATUS, CONTROL METHOD THEREOF, AND STORAGE MEDIUM

BACKGROUND OF THE INVENTION

Field of the Invention

The present disclosure relates to a recording control apparatus and a control method thereof, in particular, a technique for recording data to a recording medium.

Description of the Related Art

There are known recording apparatuses, such as digital cameras and digital video cameras, that record a moving image, still image, and audio data to a recording medium. Data is managed as a file by a file system, such as a File Allocation Table (FAT) 16, FAT 32, or Extensible FAT (exFAT) system.

Further, there is a recording medium that supports a plurality of writing methods of different writing speeds, and a recording apparatus can use a different writing method depending on the type of data to be recorded or the necessity of real-time recording. For example, in a method for a Secure Digital (SD) card, a recording area is divided into a plurality of areas (Allocation Units (also referred to as "AUs")), and in high-speed writing, data is contiguously recorded from the beginning of a free AU, whereas in normal writing, data is recorded to a free area in an AU (SD Specifications Part 1, Physical Layer, Simplified Specification, Version 5.00). This takes into consideration a characteristic of a recording medium that recording to a free area of a partially free AU in which data is recorded in part of the AU takes a longer time than recording to an entirely free AU (AU in which no data is recorded). In other words, a recording apparatus instructs a recording medium in units of AUs as recording units to thereby elicit a maximum speed of the recording medium.

An application of the characteristic gives rise to a concept of a speed class. According to the concept, the characteristic of an AU is used, and searching for a free AU and writing to the location of the free AU in recording units of RUs formed by dividing the AU are determined as a constraint on a recording apparatus, whereby the recording medium guarantees a minimum speed to the recording apparatus. In this way, a significantly effective method is provided with respect to data control in, for example, moving image recording in which failure of real-time execution of recording can eventually stop the moving image recording.

Further, a video speed class is developed as a higher concept of the speed class. The video speed class is a concept that a further constraint is imposed on a recording apparatus to thereby guarantee higher-speed performance. Specifically, the maximum AU size is changed to 512 MB, which is eightfold a conventional maximum AU size, and a new command "Set Free AU" is defined. New constraints that a recording apparatus is to inform a recording medium in advance of an AU to be used using a Set Free AU command and that use of commands "Suspend AU" and "Resume AU" is required in holding RUs in an AU are added. However, if the recording apparatus satisfies the constraints, speeds are guaranteed with respect to a three-times larger amount of data than that in the conventional speed class.

Furthermore, in the video speed class, a concept of multi-stream writing is also introduced. In the conventional speed class, speeds are guaranteed only in single-stream data recording. On the other hand, according to the concept of the video speed class, recording is guaranteed, although in a form of time sharing, even in simultaneous recording of a plurality of files to a single recording medium.

SUMMARY OF THE INVENTION

The present disclosure is directed to a balanced recording control apparatus that elicits writing performance with respect to a recording medium while effectively using a free space of the recording medium.

According to an aspect of the present disclosure, there is provided a recording control apparatus configured to control data recording to a recording medium in a first unit or in a second unit smaller than the first unit, the recording control apparatus including a position recording unit configured to control the recording medium to record a position of the second unit, the position being an intermediate position in the first unit, as position information when the data recording is completed, the position information being information about a position from which next data recording to the recording medium is to be started, and a control unit configured to control whether to cause the position recording unit to record the position information to the recording medium.

Further features of the present disclosure will become apparent from the following description of exemplary embodiments with reference to the attached drawings.

With the present disclosure, a balanced recording control apparatus that elicits writing performance with respect to a recording medium while effectively using a free space of the recording medium is provided.

BRIEF DESCRIPTION OF THE DRAWINGS

FIGS. 2A and 2B schematically illustrate a logical address map of a recording medium.

FIGS. 3A, 3B, 3C, and 3D illustrate a process in recording a moving image file.

DESCRIPTION OF THE EMBODIMENTS

An exemplary embodiment of the present disclosure will be described in detail below with reference to the drawings.

An exemplary embodiment of the present disclosure will be described in detail below with reference to the attached drawings.

In an exemplary embodiment, an example of an application to an image capturing apparatus, such as a lens-replaceable single-lens reflex type digital still camera, as an example of a recording control apparatus will be described below. An application to an apparatus that performs recording to a recording medium, such as a digital video camera or a device that has an image capturing function, such as a smartphone, is also possible.

<Configuration of Image Capturing Apparatus>

Figure 1:
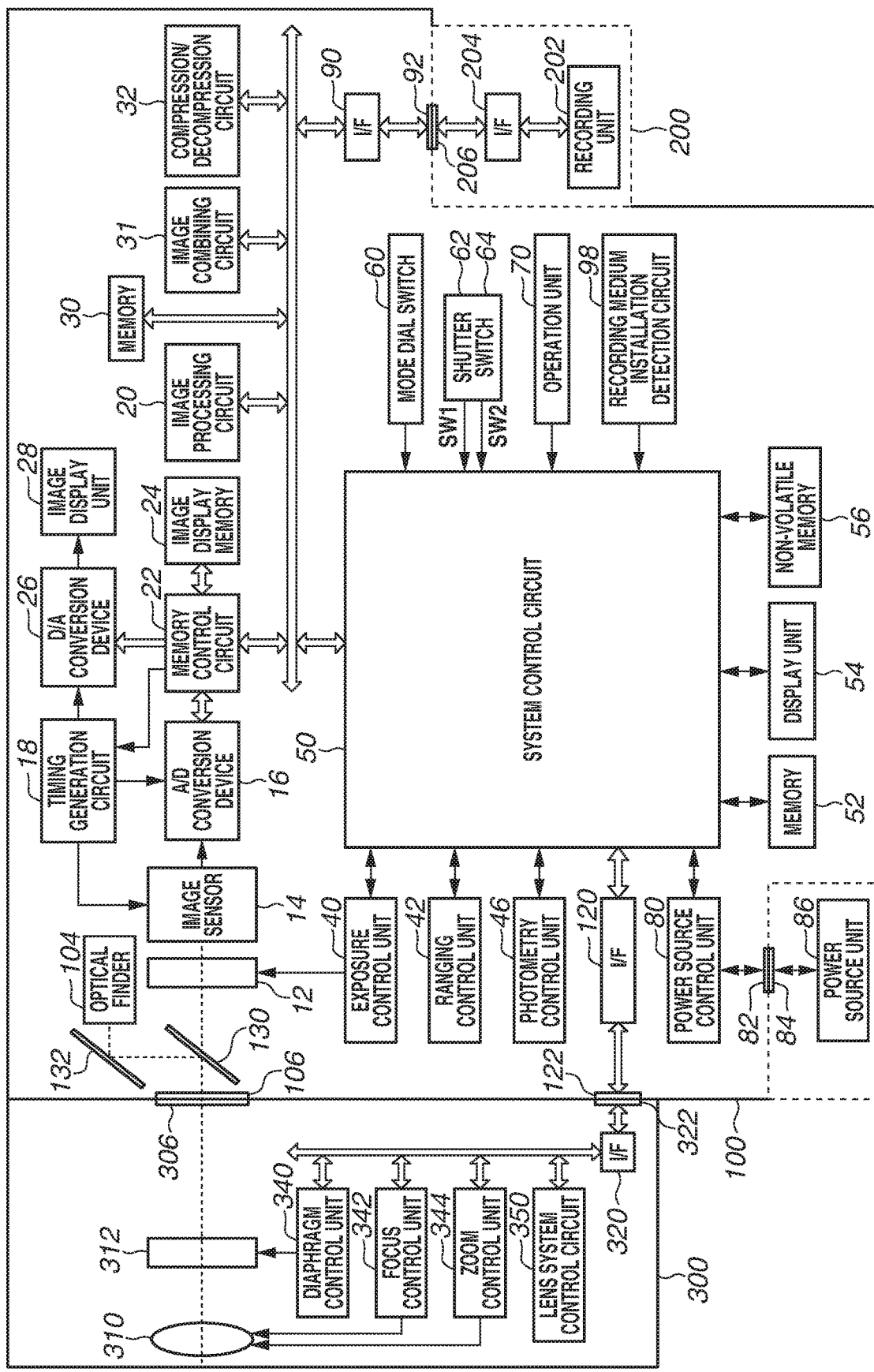
FIG. 1 is a block diagram illustrating a configuration of an image capturing apparatus.

FIG. 1 is a block diagram illustrating a configuration of an image capturing apparatus to which an exemplary embodiment of the present disclosure is applied. As illustrated in FIG. 1, the image capturing apparatus includes a camera main body 100 and a lens unit 300 of a replaceable lens type.

The lens unit 300 includes an image capturing lens 310, a diaphragm 312, and a lens mount 306. The image capturing lens 310 consists of a plurality of lenses. The lens mount 306 mechanically couples the lens unit 300 with the camera main body 100. The lens mount 306 has various functions of electrically connecting the lens unit 300 to the camera main body 100. The lens mount 306 includes an interface (I/F) 320 and a connector 322. The I/F 320 connects the lens unit 300 to the camera main body 100. The connector 322 electrically connects the lens unit 300 to the camera main body 100.

The connector 322 has a function of exchanging a control signal, a state signal, and a data signal between the camera main body 100 and the lens unit 300 and also a function of supplying currents of various voltages. Further, the connector 322 can be configured to perform communication using not only electrical communication but also optical communication and audio communication.

Further, the lens unit 300 includes a diaphragm control unit 340, a focus control unit 342, a zoom control unit 344, and a lens system control circuit 350. The diaphragm control unit 340 controls the diaphragm 312 based on photometry information from a photometry control unit 46 of the camera main body 100 in cooperation with an exposure control unit 40 configured to control a shutter 12 of the camera main body 100, which will be described below. The focus control unit 342 controls focusing of the image capturing lens 310. The zoom control unit 344 controls zooming of the image capturing lens 310. The lens system control circuit 350 controls the entire lens unit 300. The lens system control circuit 350 includes a memory 52 configured to temporarily store a constant number, a variable number, and a program for operations. Further, the lens system control circuit 350 includes a non-volatile memory 56 configured to store identification information, such as a unique number of the lens unit 300, management information, function information, such as a maximum aperture value, a minimum aperture value, and a focal length, current and previous setting values, and a program for operations.

Next, a configuration of the camera main body 100 will be described below. The camera main body 100 includes a lens mount 106 configured to mechanically couple the camera main body 100 with the lens unit 300. A light ray that enters the camera main body 100 via the lens unit 300 is reflected by mirrors 130 and 132 and guided to an optical finder 104. The mirror 130 may be configured as a quick-return mirror or a half-mirror. Further, the camera main body 100 includes the shutter 12 of a focal plane type and an image sensor 14, and an optical element 14a, such as an optical low-pass filter, is provided in front of the image sensor 14. The image sensor 14 is a charge-coupled device (CCD) sensor or complementary metal oxide semiconductor (CMOS) sensor and photoelectrically converts a subject image.

A light ray that enters the image capturing lens 310 is guided through the diaphragm 312, the lens mounts 306 and 106, the mirror 130, and the shutter 12, which function as a light amount limiting unit using a single-lens reflex method, and forms an optical image on the image sensor 14.

An analog/digital (A/D) conversion device 16 converts an analog signal (output signal) output from the image sensor 14 into a digital signal. A timing generation circuit 18 supplies a clock signal and a control signal to the image sensor 14, the A/D conversion device 16, and a digital/analog (D/A) conversion device 26. The timing generation circuit 18 is controlled by a memory control circuit 22 and a system control circuit 50.

An image processing circuit 20 performs predetermined pixel interpolation processing and color conversion processing on data from the A/D conversion device 16 or data from the memory control circuit 22. Further, the image processing circuit 20 performs predetermined calculation processing using image data output from the A/D conversion device 16, as needed. Based on the acquired calculation result, the system control circuit 50 performs contrast autofocus (AF) processing, auto-exposure (AE) processing, and electronic flash (EF) processing for controlling the exposure control unit 40 and a ranging control unit 42. Furthermore, the image processing circuit 20 performs predetermined calculation processing using image data output from the A/D conversion device 16 and performs Through-The-Lens (TTL) auto-white balancing (AWB) processing based on the acquired calculation result.

The memory control circuit 22 controls the A/D conversion device 16, the timing generation circuit 18, the image processing circuit 20, an image display memory 24, the D/A conversion device 26, a memory 30, and a compression/decompression circuit 32. Image data output from the A/D conversion device 16 is written to the image display memory 24 or the memory 30 either via the image processing circuit 20 and the memory control circuit 22 or only via the memory control circuit 22.

Image data for display that is stored in the image display memory 24 is converted into an analog signal by the D/A conversion device 26, and the analog signal is supplied to an image display unit 28 and displayed. The image display unit 28 is, for example, a thin-film-transistor (TFT) liquid crystal display (LCD). Captured image data is sequentially displayed on the image display unit 28 to thereby realize an electronic viewfinder (EVF) function. Further, the image display unit 28 can freely turn on/off the display based on an instruction from the system control circuit 50, and when the display is turned off, the power consumption of the camera main body 100 is significantly reduced.

The memory 30 is a memory configured to store a captured still image or a captured moving image and has a sufficient storage capacity for storing a predetermined number of still images or a predetermined amount of moving images. This makes it possible to write a large number of images to the memory 30 at high speed in continuous image capturing and panoramic image capturing, in which a plurality of still images is continuously captured. Further, the memory 30 is used as a frame buffer for images that are continuously written at a predetermined rate during moving image capturing. Further, the memory 30 can also be used as a work area of the system control circuit 50.

An image combining circuit 31 combines a plurality of images to thereby generate a single combined image. Thus, the image combining circuit 31 simultaneously reads a plurality of pieces of image data written to the memory 30, performs combining processing in the image combining circuit 31, and writes the generated combined image data to the memory 30. A combining target is image data that is converted by the A/D conversion device 16 and written by the memory control circuit 22 and image data on which image processing is performed by the image processing circuit 20.

The compression/decompression circuit 32 compresses (encodes) and decompresses (decodes) image data using a publicly-known compression method. The compression/decompression circuit 32 reads an image stored in the memory 30, performs compression or decompression processing on the read image, and writes the processed data to the memory 30. Further, the compression/decompression circuit 32 also has a function of compressing and encoding moving image data in a predetermined format or decompressing a moving image signal from predetermined compressed and encoded data.

The exposure control unit 40 controls the shutter 12 in cooperation with the diaphragm control unit 340 configured to control the diaphragm 312, based on photometry information from the photometry control unit 46.

The ranging control unit 42 performs AF processing. The ranging control unit 42 causes a light ray that enters the image capturing lens 310 in the lens unit 300 to enter via the diaphragm 312, the lens mounts 306 and 106, the mirror 130, and a focal point adjustment sub-mirror (not illustrated) using a single-lens reflex method and measures an in-focus state of an image formed as an optical image.

The photometry control unit 46 performs AE processing. The photometry control unit 46 causes a light ray that enters the image capturing lens 310 in the lens unit 300 to enter via the diaphragm 312, the lens mounts 306 and 106, the mirror 130, and a photometry sub-mirror (not illustrated) using a single-lens reflex method and measures an exposure state of an image formed as an optical image.

Further, the photometry control unit 46 performs AF control using a result of measurement by the ranging control unit 42 and a result of calculation on image data from the A/D conversion device 16 by the image processing circuit 20. Further, the photometry control unit 46 performs exposure control using a result of measurement by the photometry control unit 46 and a result of calculation on image data from the A/D conversion device 16 by the image processing circuit 20.

The system control circuit 50 controls the entire camera main body 100 and includes a well-known central processing unit (CPU). The non-volatile memory 56 stores a program to be executed by the CPU of the system control circuit 50. The system control circuit 50 controls a component included in the image capturing apparatus and executes calculation processing and recording control processing for recording data to a recording medium 200 based on a program read from the non-volatile memory 56.

A display unit 54 functions as a notification unit that externally provides a notification of an operation state or a message using a character, an image, and/or audio as the system control circuit 50 executes a program. The display unit 54 can include, for example, not only a visual display, such as a LCD or a light-emitting diode (LED), but also a sounding element that provides an audio notification. Further, the display unit 54 is provided in a single area or in a plurality of areas near an operation unit 70 of the camera main body 100 where the display unit 54 is visually recognizable with ease. Further, a portion of the function of the display unit 54 is provided in the optical finder 104.

The display content of the display unit 54 that is displayed on an image display unit, such as a LCD, includes a display about an image capturing mode, such as single/continuous image capturing and a self-timer, a display about recording, such as a compression rate, the number of recorded pixels, the number of recorded images, and the remaining number of capturable images, a display about an image capturing condition, such as a shutter speed, an aperture value, an exposure correction, a light control correction, the amount of light emission of an external flash, and a red-eye reduction, a display of macro image capturing, a display of a buzzer setting, a display of the remaining buttery capacity, an error display, a display of information using a number having a plurality of digits, a display of an installation state of the recording medium 200, a display of an installation state of the lens unit 300, a display of a communication I/F operation, a display of time/date, and a display of a state of connection with an external computer.

Further, examples of the display content of the display unit 54 that is displayed in the optical finder 104 include an in-focus indication, an indication of completion of preparation for image capturing, a display of a hand-shake warning, an indication of flash charging, an indication of completion of flash charging, a display of a shutter speed, a display of an aperture value, an indication of an exposure correction, and an indication of an operation of writing to the recording medium 200.

The non-volatile memory 56 is an electrically erasable/recordable storage medium that stores a program described below. For example, an electrically erasable programmable read-only memory (EEPROM) is used as the non-volatile memory 56.

Operation units 60, 62, 64, and 70 are operation units for inputting various operation instructions to the system control circuit 50 and include a switch, a dial, a touch panel, an line-of-sight detection pointing device, and an audio recognition apparatus, either alone or in combination. Details of the operation units 60, 62, 64, and 70 will be described below.

The mode dial switch 60 can switch and set a functional image capturing mode, such as an automatic image capturing mode, a programmed image capturing mode, a shutter-speed priority image capturing mode, an aperture priority image capturing mode, a manual image capturing mode, or a depth-of-focus priority (depth) image capturing mode. The mode dial switch 60 can also switch and set a functional image capturing mode, such as a portrait image capturing mode, a landscape image capturing mode, a closeup image capturing mode, a sports image capturing mode, a night scene image capturing mode, or a panoramic image capturing mode.

The shutter switch 62 (SW1) is turned on when a shutter button (not illustrated) is operated to an intermediate position (e.g., half-pressed), and the shutter switch 62 functions as a switch to provide an instruction to start an operation, such as AF processing, AE processing, AWB processing, and EF processing.

The shutter switch 64 (SW2) is turned on when the shutter button (not illustrated) is completely operated (e.g., fully-pressed), and the shutter switch 64 functions as a switch to provide an instruction to start a series of processing including exposure processing, development processing, and recording processing. First, in the exposure processing, a signal read from the image sensor 14 is written as image data to the memory 30 via the A/D conversion device 16 and the memory control circuit 22. Further, development processing is performed on the image data using a calculation by the image processing circuit 20 and the memory control circuit 22. Further, in the recording processing, image data is read from the memory 30, and the compression/decompression circuit 32 compresses the read image data, and the compressed image data is written to the recording medium 200.

The operation unit 70 includes various buttons and a touch panel. Examples include a live-view start/stop button, a moving image recording start/stop button, a menu button, a set button, a multi-screen reproduction page-break button, a flash setting button, a single/continuous/self-timer selection button, and a menu movement +/− button. Other examples include a reproduced image movement + (plus) button, a reproduced image movement − (minus) button, an image capturing quality selection button, an exposure correction button, a light control correction button, an external flash emission amount setting button, and a date/time setting button. The functions of the plus and minus buttons can include a rotary dial switch so that a numerical value and a function can be selected more quickly.

Further, the operation unit 70 includes an image display ON/OFF switch for turning on/off the image display unit 28 and a quick review ON/OFF switch for turning on/off a quick review function of automatically reproducing captured image data immediately after the image data is captured. Further, the operation unit 70 also includes a compression mode switch for selecting a Joint Photographic Experts Group (JPEG) compression rate or selecting a RAW mode, in which an image sensor signal is directly digitized and the digital signal is recorded to the recording medium 200. Further, the operation unit 70 also includes an AF mode setting switch for setting a one-shot AF mode and a servo AF mode. In the one-shot AF mode, an autofocus operation is started at the press of the shutter switch 62 (SW1), and once an in-focus state is formed, the in-focus state is maintained. In the servo AF mode, an autofocus operation is continued while the shutter switch 62 (SW1) is pressed.

A power source control unit 80 includes a battery detection circuit, a direct-current (DC)-DC converter, and a switch circuit configured to change a block to which power is to be supplied. The power source control unit 80 detects the presence/absence of an attached battery, the battery type, and the remaining battery level, controls the DC-DC converter based on the detection result and an instruction from the system control circuit 50, and supplies a necessary voltage to each component including the recording medium 200 for a necessary period.

Connectors 82 and 84 are provided. A power source unit 86 consists of a primary battery, such as an alkali battery or lithium (Li) battery, a secondary battery, such as a nickel-cadmium (NiCd) battery, nickel metal hydride (NiMH) battery, Li-ion battery, or Li-polymer battery, and an alternating-current (AC) adapter.

An interface 90 is an interface between the camera main body 100 and the recording medium 200, such as a memory card or hard disk, or a personal computer (PC). A connector 92 connects to the recording medium 200, such as a memory card or hard disk, or a PC. A recording medium installation detection circuit 98 detects whether the recording medium 200 is attached to the connector 92. An interface and a connector that support various storage medium standards can be used. Examples include a Personal Computer Memory Card International Association (PCMCIA) card, a Compact Flash (CF) (registered trademark) card, and a SD card. In a case where the interface 90 and the connector 92 are an interface and a connector that support standards, such as a PCMCIA card and a CF card, various communication cards can be connected. Examples of communication cards include a local area network (LAN) card, a modem card, a Universal Serial Bus (USB) card, and an Institute of Electrical and Electronic Engineers (IEEE) 1394 card. Other examples include a P1284 card, a Small Computer System Interface (SCSI) card, and a Personal Handy-phone System (PHS) card. Various communication cards described above are connected so that image data and management information attached to the image data can be transferred to and from another computer or a peripheral device, such as a printer.

The optical finder 104 guides a light ray incident on the image capturing lens 310 through the diaphragm 312, the lens mounts 306 and 106, and the mirrors 130 and 132 using a single-lens reflex method and causes the light ray to be visually recognized as an optical image by a user. In this way, the user can capture an image using only the optical finder 104 without using an electronic finder function of the image display unit 28. Further, some of the functions of the display unit 54, such as an in-focus state, hand-shake warning, flash charging, shutter speed, aperture value, and exposure correction, are displayed in the optical finder 104.

An interface 120 electrically connects the camera main body 100 and the lens unit 300 in the lens mount 106. A connector 122 electrically connects the camera main body 100 and the lens unit 300. Further, whether the lens unit 300 is attached to the lens mount 106 and the connector 122 is detected by a lens installation detection unit (not illustrated). The connector 122 has a function of exchanging a control signal, a state signal, and a data signal between the camera main body 100 and the lens unit 300 and also a function of supplying currents of various voltages. Further, the connector 122 can be configured to perform communication using not only electrical communication but also optical communication and audio communication.

In the present exemplary embodiment, the recording medium 200 is a memory card and includes a recording unit 202, which consists of a semiconductor memory, an interface unit 204, which is an interface between the recording medium 200 and the camera main body 100, and a connector 206, which connects to the camera main body 100.

A configuration of the image capturing apparatus according to the exemplary embodiment that includes the camera main body 100 and the lens unit 300 has been described above.

<Recording Medium 200>

In the present exemplary embodiment, a memory card (SD card) that supports the SD standards defined by the SD Card Association is used as the recording medium 200. Recording is performed using a writing method (speed class writing) according to the speed class specifications of the SD standards. The speed class specifications are specifications that guarantee minimum speeds in continuous recording of data to a recording medium. An exemplary embodiment of the present disclosure is also applicable to not a SD card but a card that includes a recording mode in which minimum speeds are guaranteed as in the SD card speed class.

In the speed class writing, a recording area (user area) of the recording unit 202 of the recording medium 200 is managed in allocation units (AUs). Each AU contains a plurality of recording units (RUs). A RU size differs depending on the card type (SD Standard Capacity (SDSC), SD High Capacity (SDHC), SD Extended Capacity (SDXC)) and the speed class type. In the current standards, the RU size is a multiple of 16 KB up to 512 KB. Each RU has a size that is an integral multiple of the size of a cluster (minimum management unit) of the recording medium 200. Speed class writing is performed only to a free AU (AU that does not contain a RU with recorded data) without recorded data. An AU that contains a RU on which data is recorded is referred to as "fragmented AU".

The present exemplary embodiment is also applicable to a recording apparatus that uses a recording medium of other standards that support a writing method that is different in a management unit of a recording area. An example of such a recording medium is a CompactFlash (CF) card. For a CF card, Video Performance Guarantee (VPG) is defined as a writing method to the guarantee minimum recording speed.

<Speed Class Writing to Recording Medium 200>

First, FIGS. 2A and 2B will be described below. FIGS. 2A and 2B each schematically illustrate a logical address map that includes the concept of AUs and RUs of the recording unit 202 in the recording medium 200. The number of RUs and the number of AUs differ for each recording medium. In the present exemplary embodiment, the recording unit 202 in the recording medium 200 contains 131072 RUs, from the zeroth RU (RU_0) to $131071^{st}$ RU (RU_131071). Each AU contains eight RUs, and there are 16384 AUs, from the zeroth AU (AU_0) to $16383^{nd}$ AU (AU_16383).

The AU_0 (RU_0 to RU_7) is used as a management area, and system information for managing a data recording area is recorded to the AU_0. In the present exemplary embodiment, a master boot record (MBR), basic input/output system (BIOS) parameter block (BPB), file allocation table (FAT), and directory entry (DE) are described as examples of system information. The system information, however, is not limited to those described above. Since the described examples of system information are publicly-known, detailed description thereof is omitted. Further, The AU_1 to the AU_16383 (RU_8 to RU_131071) are used as a data recording area for recording data.

A difference between a method of using RUs in AUs in conventional speed class writing and single stream writing, which is a common method of using a video speed class (hereinafter, referred to as "VSC"), will be described below with reference to FIGS. 2A and 2B.

First, a sequence of using RUs in the conventional speed class in FIG. 2A will be described below. First, a search for a free AU in which none of the RUs logically contains data is performed. This is performed to write data to an entirely free AU so that maximum performance of the recording medium 200 is elicited and high-speed writing is realized using the characteristic of AUs of the recording medium 200, as described above. Next, a write instruction is issued to the detected free AU in units of RUs, and data is written in units of RU size. Then, if data is written to all the RUs in the AU to which data is being written, a search for a next entirely free AU is performed, and data is written in units of RUs as described above. This is repeated to sequentially perform recording, and writing to a first file (DATA 1) is ended. The data writing is ended without issuing a special command. Next, to write to a second file (DATA 2), a search for an entirely free AU is performed again, and data is written to the detected free AU in units of RUs as in the control in writing the first file. At this time, if an end position of the data (DATA 1) of the first file is in units of AUs (the last RU in the AU), no issue arises. On the other hand, in a case where the writing is not ended in units of AUs, i.e., the writing is ended not at the last RU but at an intermediate RU other than the last RU in the AU, there are remaining RUs to which no data is written in the AU. The remaining RUs in the AU become an area that cannot be used as a conventional speed class area and, thus, cannot be used in writing the second file.

Next, a method of using RUs in writing in a VSC single stream will be described below with reference to FIG. 2B. First, for the first file (DATA 1), a search for an entirely free AU is performed, and data is written to the free AU in units of RUs, as in the conventional speed class. Note that prior to the data writing in units of RUs, a Set Free AU command is issued, and the recording medium 200 is informed in advance of the free AU to be used. In the Set Free AU command, a plurality of AUs is designated in advance. In the Set Free AU command, up to eight AUs can be designated in advance. In VSC, if data is written to a location other than the AUs designated by the Set Free AU command, it is considered that the VSC restrictions are violated, and speeds are no longer guaranteed.

The free AUs to be used are specified in advance using a Set Free AU command so that even if there is previous data at the specified location, the recording medium 200 can switch to a mode in which the data is invalidated and continuous writing is performed. This produces a merit that garbage collection due to fragmentation of the recording medium 200 is prevented. However, since only up to eight AUs can be designated in advance in a Set Free AU command, in a case where more AUs are to be used, another Set Free AU command needs to be issued. There is also a demerit that the Set Free AU command causes a maximum of 250-ms command overhead and the recording apparatus cannot access the recording medium 200 during the overhead.

In the VSC single stream, the recording medium 200 is accessed and data is written to the recording medium 200 using a combination of a Set Free AU command and an instruction to write in units of RUs. The VSC single stream is significantly different from the conventional speed class in that control at the end of the writing of the first and subsequent files (DATA 1) and control at the start of the next writing of the second and subsequent files (DATA 2) are significantly different. Specifically, a Suspend AU command is issued at the end of the recording of the first and subsequent files, and a Resume AU command is issued at the start of the recording of the second and subsequent files. The Suspend AU command is a command by which information about the position of a next free RU following a data-recorded RU to which data is immediately previously written according to a write instruction is stored in a resistor in the recording medium 200. Specifically, the position of the next free RU to which data is to be written next is stored in the recording medium 200. Further, the Resume AU command is a command by which the information about the RU position stored in the recording medium 200 by the Suspend AU command is acquired from the recording medium 200. The information is stored in the resistor in the recording medium 200 so that the information is retained even if the recording medium 200 is turned off or on.

For example, in FIG. 2B, after DATA 1 writing is ended, a Suspend AU command is issued so that position information about the RU_19 is stored in the recording medium 200 as RU position information that specifies a position from which next recording is to be started. Specifically, the RU position that is a position from which next recording is to be started is recorded to the recording medium 200. Then, before DATA 2 writing is started, a Resume AU command is issued, and the position information about the RU_19 is acquired so that DATA 2 writing is started from the RU_19.

Next, the concept of VSC multi-stream writing will be described below (for more details, please refer to Non-Patent Document 1, the simplified specifications provided by the SD Association (SDA)). In the present specification, commands for VSC multi-stream writing, i.e., an Update DIR command and a Release Dir command, will be described in detail below.

First, in a conventional speed class recording control method, a sector that corresponds to a directory entry on a file system of a generated file is issued to the recording medium 200 and registered in the recording medium 200 through an Update DIR command. The sector is registered in advance so that when the recording medium 200 is randomly accessed, if a destination of the random access is the registered sector, special control is performed to minimize a decrease in speed. Thereafter, after a Set Free AU command is executed, a Start Rec command, which is a recording start command, is called, and data recording to the recording medium 200 is started. No special command is issued at the end of the data (file) recording.

Next, a video speed class multi-stream writing control method will be described below. First, a sector that corresponds to a directory entry of a generated file is registered using an Update DIR command, as in the conventional method. Then, after a Set Free AU command is executed, a Start Rec command is executed, and video speed class control is started. Thereafter, a new file is generated, and video speed class data recording to the new generated file can be performed simultaneously with the recording to the previously-generated file. However, as the remaining capacity of the sector registered using the Update DIR command decreases, recording of directory entry information about a new image file to the registered sector becomes impossible. When the recording becomes no longer possible, it is necessary to issue a new Update DIR command and register a sector to which directory entry information is to be recorded, in the recording medium 200. According to the video speed class standards, up to eight sectors can be registered simultaneously using an Update DIR command. Then, after the directory entry of the file is recorded to the registered sector, a Release Dir command, which is a pair command of the Update DIR command, is issued, and the setting of the registered sector is cancelled. If the number of issued Release Dir commands becomes equal to the number of issued Update DIR commands, the video speed class recording is automatically ended.

Further, the video speed class multi-stream writing has not only command-issuance constraints but also writing-location constraints (please refer to Non-Patent Document 1). In multi-stream writing, a speed class is not guaranteed for each file, but a plurality of files performs time-sharing with respect to a minimum speed guarantee, so that a writing destination needs to be a continuous area. For example, in a case where a file 1 writes 64-MB data to a 512-MB AU, a file 2 needs to be written not to the next AU but to a continuous location following the 64-MB area to which the file 1 is written in the 512-MB AU. In a case where this constraint is not satisfied, the video speed class is not guaranteed and the video speed class is cancelled, and a Start Rec command needs to be issued again.

In a case where a plurality of files is recorded to the same AU, if one of the plurality of files is erased, the free capacity of a non-speed class is increased by the amount of the erased file, but the free capacity of the speed class, which requires an entirely free AU, is not increased.

As described above, the RU use method and the file control method in the video speed class are controlled differently from the control in the conventional speed class, so that the minimum speed guarantee in the video speed class is increased threefold. Furthermore, more effective use of the free capacity and multi-stream writing become possible.

As described above, use of a Suspend AU command and a Resume AU command makes it possible to start data writing from an intermediate remaining RU in an AU. Thus, a plurality of files can be recorded to continuous RUs in a single AU without producing a remaining RU.

However, there are cases where not many merits are produced, as it takes time to process a Suspend AU command. In a case where a Suspend AU command is executed, a RU position in an AU is stored using the Suspend AU command. However, in a case where writing processing is performed in units of AUs at the time of restarting recording as in the conventional speed class, first the remaining RUs in the AU need to be filled, and then a search for an entirely free AU needs to be performed to record the remaining data. Thus, the time to search for a free AU is needed and, furthermore, an overhead time occurs when an address jumps in the recording medium 200, so that a decrease in speed can occur.

If the above-described processing is performed not only at the time of restarting recording but also each time a write instruction is issued, the maximum performance of the recording medium 200 is not elicited even if the speed class standards are not violated, and a decrease in speed can occur.

Thus, the image capturing apparatus according to the present exemplary embodiment executes a process described below in order to effectively use a Suspend AU command and a Resume AU command in the video speed class while preventing a decrease in the processing speed of the recording medium 200.

FIGS. 3A to 3D each illustrate a process of recording a moving image file in the video speed class (VSC).

First, FIG. 3A will be described below. FIG. 3A illustrates a case where a Suspend AU command is issued when recording of a moving image file (moving images 1, 2, and 3) is completed and recording control is performed so that next moving image file recording is started from an intermediate RU in the AU using a Resume AU command. Further, FIG. 3A illustrates a case where the AU size is 16 MB, each AU consists of eight RUs, and moving image recording is started in a state where an AU 1 is entirely free and AUs 2 and 3 adjacent to the AU 1 are also entirely free. In this case, issuing a Suspend AU command each time recording of a moving image file is completed is a significant merit, because since it is known that the adjacent AUs are entirely free, the AU search time is zero and, furthermore, no address jump occurs, so that overhead due to the recording medium 200 does not occur. Thus, only the merit that the free capacity is effectively used is produced.

FIG. 3B illustrates a case where the AU size is 512 MB, each AU consists of eight RUs, and recording is started from the AU 1 in a state where the AU 1 is entirely free, the AU 2 next to the AU 1 is not entirely free, and the AU 3 next to the AU 2 is entirely free. In a case where recorded data is erased or edited, an internal state may be fragmented in which only an intermediate AU is used. In FIG. 3B, recording of a moving image 1 is started from the beginning of the AU 1, and a Suspend AU command is issued when recording of the moving image 1 corresponding to the size of two RUs is completed, and a Resume AU command is issued when recording of a file of a next moving image 2 is started. In this case, since the AU 2 next to the AU 1 is not free, recording of the moving image 2 is started from the RU_2 in the AU 1, and the moving image 2 is recorded to the RU_7, which is the last RU in the AU 1. Then, a search for a free AU is performed, and recording of a moving image 2-2, which is a continuation of a moving image 2-1 (a portion of the moving image 2) recorded to the AU 1, is started from the RU_16 of the AU 3, which is a free AU. Specifically, there is a demerit that an AU search and overhead due to an address jump in the recording medium 200 occur during recording of the moving image 2 (moving images 2-1 and 2-2). However, since the size of each RU is large due to the large AU size and, furthermore, six RUs are unused in FIG. 3B, an advantage that the 384-MB capacity of the six RUs is used and not wasted using a Suspend AU command and a Resume AU command is more significant than the demerit.

FIG. 3C illustrates a case where the AU size is 16 MB, each AU consists of eight RUs, and recording is started from the AU 1 in a state where the AU 1 is entirely free, the AU 2 next to the AU 1 is not entirely free, and the AU 3 next to the AU 2 is entirely free. Further, in FIG. 3C, the moving image 1 corresponding to the size of six RUs is recorded to the AU 1, and when the recording of the moving image 1 is completed, a Suspend AU command is issued. Then, at the time of starting recording the next moving image 2, a Resume AU command is issued, and recording of the moving image 2 is started from the intermediate RU (RU_6) in the AU 1. In this case, since the AU 2 next to the AU 1 is not free, an AU search and overhead due to an address jump in the recording medium 200 occur during recording of the moving image 2 (moving images 2-1 and 2-2) as in FIG. 3B. In the case illustrated in FIG. 3C, the AU size is 16 MB, which is small, and the number of remaining RU is two, which is also small, so that only a small-size area of 4 MB corresponding to the two RUs is utilized using a Suspend AU command and a Resume AU command and, thus, the advantage is few, not as in FIG. 3B.

Thus, in the case as illustrated in FIG. 3C, data recording without using a Suspend AU command and a Resume AU command is more advantageous.

FIG. 3D illustrates a case where the moving images 1 and 2 are recorded as in FIG. 3C without using a Suspend AU command and a Resume AU command. In this case, when the recording of the moving image 1 is completed, no Suspend AU command is issued, so that the RU_6 and the RU_7 of the AU 1 are not used and the capacity of 4 MB is wasted. However, an AU search and overhead due to an address jump in the recording medium 200 do not occur while the moving image 2 is recorded, so that this case is advantageous from the point of view of processing time.

Figure 4:
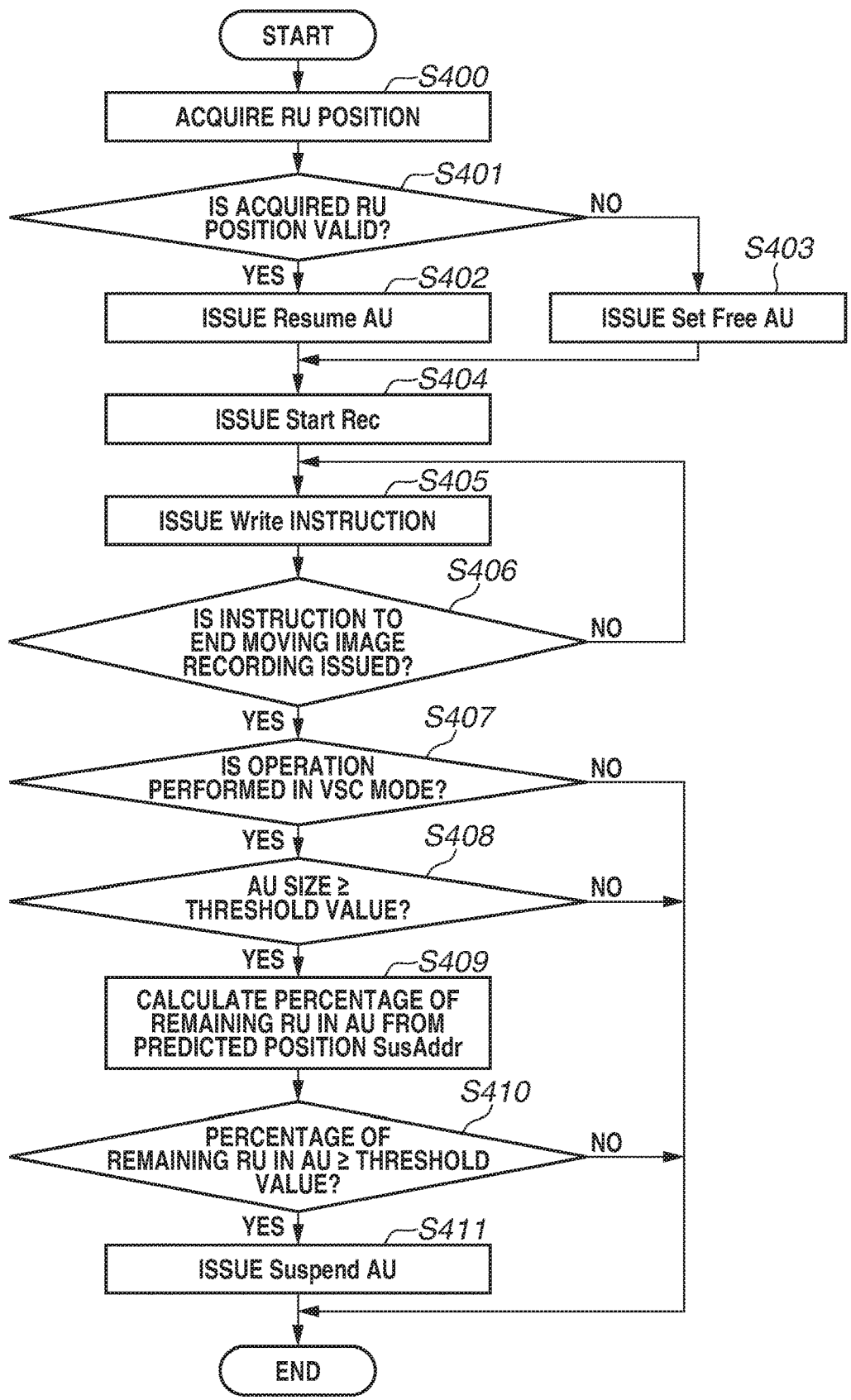
FIG. 4 is a flowchart illustrating a process of recording moving image data according to an exemplary embodiment of the present disclosure.

As described above, whether a Suspend AU command and a Resume AU should be used or should not be used depends on the AU size and the RU position from which next recording is to be started in issuing a Suspend AU command. Thus, in the present exemplary embodiment, a process illustrated in FIG. 4 is executed to select whether to start recording from an intermediate RU in an AU using a Suspend AU command and a Resume AU command.

<Moving Image Recording Sequence>

Next, a main sequence according to the present exemplary embodiment will be described below with reference to FIG. 4. If an instruction to start recording a moving image is issued, the process illustrated in FIG. 4 is executed. The system control circuit 50 executes a program read from the non-volatile memory 56 and controls calculation and the components to thereby realize the sequence.

First, in step S400, the system control circuit 50 transmits a command (CMD) 13 to the recording medium 200 and acquires RU position information stored in the resistor of the recording medium 200. The RU position information can be acquired at the time of starting recording a moving image as in step S400 or before an instruction to start recording a moving image is received. For example, the RU position information can be acquired at a timing when the recording medium 200 is attached and connected to the image capturing apparatus or at a timing when the image capturing apparatus is turned on, and the acquired RU position information is stored in the memory 52.

Next, in step S401, the system control circuit 50 determines whether the RU position acquired in step S400 is valid. In step S401, the system control circuit 50 determines that the acquired RU position is valid if the value of the RU position acquired from the recording medium 200 is either zero or a value that indicates a RU position outside the range of the data recording area of the recording medium 200. Any other methods can be used to determine whether the acquired RU position is valid or invalid.

In a case where the RU position acquired in step S401 is valid (YES in step S401), then in step S402, the system control circuit 50 issues a Resume AU command to the recording medium 200. On the other hand, in a case where the RU position acquired in step S401 is not valid but invalid (NO in step S401), then in step S403, the system control circuit 50 issues a Set Free AU command to the recording medium 200. Then, in step S404, the system control circuit 50 issues a Start Rec command to the recording medium 200 to start speed class moving image recording. Although not described herein, various settings are made and prerequisite commands are issued before the Start Rec command is issued in step S404. As described above, in a case where the RU position that is stored in the recording medium 200 and from which next recording is to be started is valid information, a Resume AU command is issued, and data recording is started from the RU position. On the other hand, in a case where the RU position stored in the recording medium 200 is invalid information, a Set Free AU command is issued, and a free AU without recorded data is designated and data is recorded. Next, in step S405, a write instruction is issued. The write instruction can be an instruction to perform any writing that complies with the speed class standards for writing to an entirely free AU or writing from a RU position designated by a Resume AU command in units of RUs. In the present exemplary embodiment, image capturing is started in response to a recording start instruction, and moving image data in a predetermined format on which image processing and compression/encoding processing are performed is stored in the memory 30. The system control circuit 50 reads moving image data to be recorded from the memory 30, executes a write instruction, and records the moving image data to the recording medium 200. At this time, the system control circuit 50 waits until the size of the moving image data to be recorded that is stored in the memory 30 becomes the AU size, and if the size becomes the AU size, the system control circuit 50 executes a write instruction to write moving image data corresponding to the AU size. Specifically, in the present exemplary embodiment, data is written in units of AUs. Since data is written in units of AUs, in a case where a Set Free AU command is issued and data is written to an entirely free AU, the data writing does not cross an AU boundary. However, in a case where a Resume AU command is issued and data is written from an intermediate RU position in the AU, the data writing crosses an AU boundary every time, so that the writing speed decreases. In a case where a valid RU position is recorded in the recording medium 200, although the writing speed decreases, the free capacity of the recording medium 200 is effectively used by starting recording from the intermediate RU position in the AU.

In step S406, the system control circuit 50 checks whether an instruction to end moving image recording is issued. The user can input an instruction to end recording by operating the operation unit 70. In a case where an instruction to end recording is not issued (NO in step S406), the processing returns to step S405, and an instruction to write moving image data is issued again. On the other hand, in a case where an instruction to end recording is issued (YES in step S406), the processing proceeds to step S407.

In step S407, the system control circuit 50 determines whether the current operation is performed in the VSC mode. In a case where the system control circuit 50 determines that the current operation is not performed in the VSC mode (NO in step S407), the moving image recording process is ended without issuing a Suspend AU command in in step S411.

On the other hand, in step S407, in a case where the system control circuit 50 determines that the current operation is performed in the VSC mode (YES in step S407), then in step S408, the system control circuit 50 determines whether the AU size in the VSC mode is larger than or equal to a predetermined threshold value (predetermined size). If the AU size is smaller than the threshold value (NO in step S408), the moving image recording process is ended without issuing a Suspend AU command in in step S411.

On the other hand, in step S408, in a case where the system control circuit 50 determines that the AU size in the VSC mode is larger than or equal to the threshold value (YES in step S408), then in step S409, the system control circuit 50 predicts a RU position (SusAddr) from which next recording is to be started and which is stored in the recording medium 200 in a case where a Suspend AU command is issued. Then, the percentage of RUs without recorded data (the percentage of remaining RUs in the AU) in the AU that includes the predicted RU position is calculated. For example, in a case where each AU consists of eight RUs and the predicted RU position (SusAddr) is the seventh RU from the AU boundary, the percentage of remaining RUs in the AU={8−(7−1)}/8=2/8. Then, in step S410, the system control circuit 50 determines whether the percentage of remaining RUs in the AU that is calculated in step S409 is higher than or equal to a threshold value. In a case where the calculated percentage is lower than the threshold value (NO in step S410), the moving image recording process is ended without issuing a Suspend AU command in in step S411. On the other hand, in a case where the percentage of remaining RUs in the AU is higher than or equal to the threshold value (YES in step S410), the processing proceeds to step S411. The percentage of RUs without recorded data in the AU that includes the RU position from which next recording is to be started is calculated in step S409, and the calculated percentage is compared with the threshold value in step S410. Alternatively, the size of a recording area without recorded data in the AU that includes the RU position from which next recording is to be started is calculated, and a Suspend AU command is issued in a case where the calculated size of the recording area without recorded data is larger than or equal to a threshold value size, whereas no Suspend AU command is issued in a case where the calculated size is smaller than the threshold value size. Alternatively, a Suspend AU command is issued in a case where the percentage of RUs with recorded data in the AU that includes the RU position from which next recording is to be started is not higher than a predetermined threshold value or in a case where the size of the area with recorded data in the AU that includes the RU position from which next recording is to be started is not larger than a predetermined threshold value, whereas no Suspend AU command is issued in a case where the percentage is higher than the threshold value or in a case where the size is larger than the predetermined threshold value.

In step S411, the system control circuit 50 issues a Suspend AU command and records an intermediate RU position that is an intermediate position in the AU to the recording medium 200 so that recording in next writing is started from the intermediate RU position in the AU.

As described above, the image capturing apparatus according to the present exemplary embodiment selects whether to issue a Suspend AU command and store a RU position at the time of ending data recording based on the RU position for restarting recording that is to be stored in the recording medium 200 using the Suspend AU command or the AU size. Thus, a balanced recording control apparatus that elicits writing performance with respect to a recording medium while effectively using a free space of the recording medium is provided.

In the above-described exemplary embodiment, whether to issue a Suspend AU command is determined and whether to issue a Suspend AU is selected at the time of ending data recording. Alternatively, whether to start data recording from an intermediate RU position in an AU using a Resume AU command or whether to start data recording from an AU change position using a Set Free AU command is selected at the time of starting data recording based on the RU position from which recording is to be restarted and the AU size in the VSC mode.

Further, while whether to issue a Suspend AU command is selected in moving image capturing in the above-described exemplary embodiment, similar processing can be performed also in continuous still image capturing. Continuous still image capturing is an image capturing mode in which a plurality of images is continuously captured as in moving image capturing, so that an advantage similar to that in moving image capturing is produced. Alternatively, whether to issue a Suspend AU command is selected in moving image capturing or continuous still image capturing as illustrated in FIG. 4, whereas whether to issue a Suspend AU command is not determined or selected in single still image capturing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-004270, filed Jan. 15, 2019, which is hereby incorporated by reference herein in its entirety.

What is claimed is:

1. A recording control apparatus configured to control data recording to a recording medium in a first unit or in a second unit smaller than the first unit, the recording control apparatus comprising:
   a memory and at least one processor which execute the following steps:
   issuing, to the recording medium, a set Free Allocation Unit command for recording data in a first recording mode that is a mode of guaranteeing a recording speed by controlling the data recording in the first unit;
   issuing a Suspend Allocation Unit command for recording a position of the second unit, the position being an intermediate position in the first unit, as position information, to the recording medium, when the data recording is completed in the first recording mode, the position information being information about a position from which next data recording to the recording medium is to be started;
   predicting the position recorded by the Suspend Allocation Unit command into the recording medium, and controlling whether to issue the Suspend Allocation Unit command to the recording medium depending on a state of the first unit in which the predicted position of the second unit is included;
   issuing, to the recording medium, a Resume Allocation Unit command for starting recording from the position of the second unit by using the position information recorded in the recording medium in a case where the position information is recorded in the recording medium, thereby ensuring that the data is to be recorded in the first recording mode even when the recording is started from the position of the second unit that is the intermediate position in the first unit; and
   issuing the set Free Allocation Unit command in a case where the position information is not recorded in the recording medium, thereby ensuring that the data is to be recorded in the first recording mode.

2. The recording control apparatus according to claim 1, wherein the memory and the at least one processor further execute control whether to record the position information to the recording medium when the data recording is completed based on the position from which next data recording is to be started.

3. The recording control apparatus according to claim 2, wherein in a case where a percentage of the second unit without recorded data in the first unit that includes the position of the second unit from which next data recording is to be started is lower than a predetermined percentage, the memory and the at least one processor further execute control so that the position information is not recorded.

4. The recording control apparatus according to claim 2, wherein in a case where a size of an area without recorded data in the first unit that includes the position of the second unit from which next data recording is to be started is smaller than a predetermined size, the memory and the at least one processor further execute control so that the position information is not recorded.

5. The recording control apparatus according to claim 2, wherein in a case where a percentage of the second unit with recorded data in the first unit that includes the position of the second unit from which next data recording is to be started is higher than a predetermined percentage, the memory and the at least one processor further execute control so that the position information is not recorded.

6. The recording control apparatus according to claim 2, wherein in a case where a size of an area with recorded data in the first unit that includes the position of the second unit from which next data recording is to be started is larger than a predetermined size, the memory and the at least one processor further execute control so that the position information is not recorded.

7. The recording control apparatus according to claim 1, wherein the memory and the at least one processor further execute control to record the position information to the recording medium based on a size of the first unit.

8. The recording control apparatus according to claim 7, wherein in a case where the size of the first unit is smaller than a predetermined size, the memory and the at least one processor further execute control so that the position information is not recorded.

9. The recording control apparatus according to claim 1, wherein the first recording mode is a predetermined speed class, and
   wherein the predetermined speed class is a speed class that guarantees a recording speed by recording data in the first unit.

10. The recording control apparatus according to claim 1, wherein the predetermined speed class is a video speed class.

11. The recording control apparatus according to claim 1, wherein the first unit is an allocation unit, and the second unit is a recording unit.

12. The recording control apparatus according to claim 1, wherein the memory and the at least one processor further execute the Suspend Allocation Unit command to the recording medium so that the position information about the position from which next data recording is to be started is recorded to the recording medium, and
   wherein, by issuing the Resume Allocation Unit command to the recording medium, the memory and the at least one processor causes the data recording to be started from the position of the second unit, which is the intermediate position in the first unit, by using the position information recording to the recording medium.

13. The recording control apparatus according to claim 1, wherein the memory and the at least one processor selects whether to start data recording from the position of the second unit that is the intermediate position in the first unit using the position information recorded in the recording medium or start data recording from a start position of the first unit without using the position information.

14. The recording control apparatus according to claim 1, wherein the memory and the at least one processor further configured to acquire the position information from the recording medium,
   wherein the memory and the at least one processor determines whether to start data recording from the position of the second unit that is the intermediate position in the first unit using the position information recorded in the recording medium or start data recording from the start position of the first unit without using the position information based on the acquired position information.

15. The recording control apparatus according to claim 1, wherein the memory and the at least one processor execute a second recording mode in which data is recorded in the first unit irrespective of the position information.

16. The recording control apparatus according to claim 1, wherein in moving image capturing or in continuous still image capturing, the memory and the at least one processor further controls whether to record the position information to the recording medium, whereas in single still image capturing, the memory and the at least one processor does not control to record the position information to the recording medium.

17. The recording control apparatus according to claim 1, further comprising an image capturer configured to capture an image,
wherein image data captured by the image capturer is recorded to the recording medium.

18. A method of controlling a recording control apparatus configured to control data recording to a recording medium in a first unit or in a second unit smaller than the first unit, the method comprising:
issuing, to the recording medium, a set Free Allocation Unit command for recording data in a first recording mode that is a mode of guaranteeing a recording speed by controlling the data recording in the first unit;
issuing a Suspend Allocation Unit command for recording a position of the second unit, the position being an intermediate position in the first unit, as position information, to the recording medium, when the data recording is completed in the first recording mode, the position information being information about a position from which next data recording to the recording medium is to be started;
predicting the position recorded by the Suspend Allocation Unit command into the recording medium, and controlling whether to issue the Suspend Allocation Unit command to the recording medium depending on a state of the first unit in which the predicted position of the second unit is included;
issuing, to the recording medium, a Resume Allocation Unit command for starting recording from the position of the second unit by using the position information recorded in the recording medium in a case where the position information is recorded in the recording medium, thereby ensuring that the data is to be recorded in the first recording mode even when the recording is started from the position of the second unit that is the intermediate position in the first unit; and
issuing the set Free Allocation Unit command in a case where the position information is not recorded in the recording medium, thereby ensuring that the data is to be recorded in the first recording mode.

19. A non-transitory computer-readable storage medium that stores a program for executing a method of controlling a recording control apparatus configured to control data recording to a recording medium in a first unit or in a second unit smaller than the first unit, the method comprising:
issuing, to the recording medium, a set Free Allocation Unit command for recording data in a first recording mode that is a mode of guaranteeing a recording speed by controlling the data recording in the first unit;
issuing a Suspend Allocation Unit command for recording a position of the second unit, the position being an intermediate position in the first unit, as position information, to the recording medium, when the data recording is completed in the first recording mode, the position information being information about a position from which next data recording to the recording medium is to be started;
predicting the position recorded by the Suspend Allocation Unit command into the recording medium, and controlling whether to issue the Suspend Allocation Unit command to the recording medium depending on a state of the first unit in which the predicted position of the second unit is included;
issuing, to the recording medium, a Resume Allocation Unit command for starting recording from the position of the second unit by using the position information recorded in the recording medium in a case where the position information is recorded in the recording medium, thereby ensuring that the data is to be recorded in the first recording mode even when the recording is started from the position of the second unit that is the intermediate position in the first unit; and
issuing the set Free Allocation Unit command in a case where the position information is not recorded in the recording medium, thereby ensuring that the data is to be recorded in the first recording mode.

* * * * *